United States Patent [19]

Hoshi et al.

[11] 4,114,830
[45] Sep. 19, 1978

[54] ROTATION CONTROL SYSTEM

[75] Inventors: Juro Hoshi, Hamamatsu; Makoto Watanabe, Tokyo, both of Japan

[73] Assignee: Nippon Gakki Seizo Kabushiki Kaisha, Hamamatsu, Japan

[21] Appl. No.: 801,995

[22] Filed: May 31, 1977

[30] Foreign Application Priority Data

Jun. 2, 1976 [JP] Japan .................................. 51/63551

[51] Int. Cl.² ........................ B65H 59/38; G03B 1/02
[52] U.S. Cl. .................................. 242/191; 242/75.52
[58] Field of Search ............... 242/186, 190, 191, 204, 242/75.5–75.52; 250/571; 360/73, 74; 318/6, 7

[56] References Cited

U.S. PATENT DOCUMENTS

| 3,806,061 | 4/1974 | Kollar et al. | 242/186 |
| 3,849,661 | 11/1974 | Beiter | 250/571 |
| 3,854,676 | 12/1974 | Fischer et al. | 242/191 |

Primary Examiner—Leonard D. Christian
Attorney, Agent, or Firm—Cushman, Darby & Cushman

[57] ABSTRACT

In a tape recorder, the rotation of a tape reel is detected and converted to a pulse signal having a repetition frequency proportional to the rotation speed of the tape reel. This pulse signal is supplied to a pair of frequency-voltage converters having different time constants to provide different outputs therefrom. The rotation of the tape reel is controlled by braking the rotation of the tape reel with a force proportional to the difference of the above two outputs.

9 Claims, 4 Drawing Figures

ROTATION CONTROL SYSTEM

BACKGROUND OF THE INVENTION

1. Field of the Invention

The present invention relates to a rotation control system, and more particularly it pertains to a system for stabilizing the rotation speed of a rotating body.

2. Description of the Prior Art

In a magnetic recording and reproducing device (hereinafter referred to as tape recorder) or like devices, the running speed of the tape mounted on the device should be kept precisely constant, and the rotation of a feed reel and a take-up reel should be stabilized or controlled for preventing the generation of wow-flutter and like phenomena. Various counter-measures have been proposed and employed for improving the characteristics of wow-flutter and like phenomena. Namely, from the mechanical and structural viewpoints, there have been employed means intended for making smooth the rotation of the pinch-roller and capstan and like parts for driving the tape, or for enhancing the accuracy of circularity of those rotating parts, or there has been provided a fly-wheel of large inertia and excellent balance attached to the capstan driving shaft, or there has been enhanced the processing accuracy of respective parts. Furthermore, from the electrical viewpoint, there have been adopted, for example, such counter-measures as that: a servo-motor is used for driving the tape, and that the running speed of a tape is detected electromagnetically or optically to control the servo-motor by the detection output, etc.

However, there are limitations in successfully achieving the above-mentioned improvements in the mechanical aspects, and the use of a servo-motor in the electrical aspects inevitably brings about a substantial increase in the manufacturing cost since the servo-motor is expensive. Therefore, such counter-measures have been employed only in high grade systems for use in, for example, broadcasting stations. From the economical viewpoint, therefore, none of the conventionally proposed counter-measures can be employed as desirable improvements. Furthermore, these conventional counter-measures have been proposed mainly for the purpose of stabilizing the fluctuations in the rotation of the rotating members of the capstan system. Regarding the driving of the tape reels, only a weak driving force has been given to the reel through a slipping driving mechanism or a braking mechanism so as to prevent the occurrence of slackening of the tape during running.

In such conventional devices, fluctuations or variation of the tape running speed are unavoidable due to various causes, such as the variations in the tension of the tape, which tension changing depending on the amount of the tape wound around a tape reel and the variations in the rotating torque acting on the tape reel by the running tape, and deviations of the thickness and also depending on the friction of the tape itself. However, adequate and effective means never has been proposed in the past for easily and economically satisfying the general requirements for ensuring high fidelity operation in various kinds of magnetic recording and reproducing devices.

SUMMARY OF THE INVENTION

The present invention has its aim to satisfy such requirements as mentioned above, and an object of the present invention is to provide a rotation control system in a tape feeding and take-up device using tape reels, which is capable of easily and economically controlling the rotation of a feeding reel and/or a take-up reel to suppress variations or fluctuations of the running speed of the tape.

Another object of the present invention is to provide a rotation control system in a tape feeding and take-up device using tape reels, comprising: detector means for generating a signal of a frequency corresponding to the rotation of a tape reel; a plurality of frequency-voltage converters having different time constants and receiving the output signal of the detector means; and braking means for imparting a braking force to the rotating tape reel in response to the difference in the outputs of said frequency-voltage converters.

According to an aspect of the present invention, fluctuations in the speed of rotation of a tape reel can be stabilized easily and economically without the use of a servo-motor. The wow-flutter of a tape recorder can be easily improved to provide high fidelity operations of recording and reproduction.

Other objects, features and advantages of the present invention will become apparent from the following detailed description of the preferred embodiments when taken in conjunction with the accompanying drawings.

DESCRIPTION OF THE PREFERRED EMBODIMENTS

Figure 1:
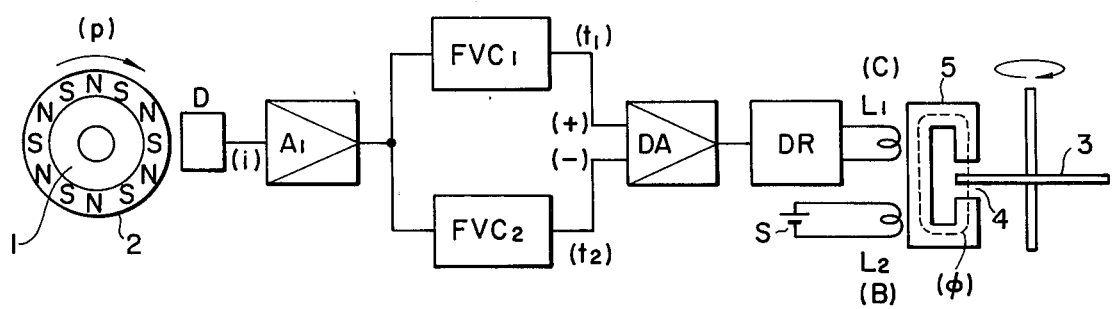
FIG. 1 is a basic block diagram of a rotation control system according to an embodiment of the present invention.

FIG. 1 shows a basic structure of the rotation control system in a tape recorder, in which a rotating disk 1 provided with magnets 2 is mounted on or interlocked with the rotary shaft of a tape reel (not shown). If the tape reel is a take-up reel, it is driven, through an appropriate slipping mechanism, from a driving motor which may also drive a capstan to feed the tape. A magnetic detector D including a reed switch, a Hall element, a pickup coil, etc. is provided in the neighborhood of the rotating disk 1 to generate a pulse signal having a repetition frequency proportional to the rotation speed of the rotating disk 1. Here, it will be apparent that the accuracy of detection of the detector D will increase with an increase in the number of poles of the magnets 2. On the other hand, a metal disk 3 similar to the rotating disk 1 is mounted on or interlocked with the rotary shaft of the tape reel. A magnetic yoke 5 having a pair of magnetic pole pieces defines a gap 4 through which the metal disk 3 is inserted and rotated in a spaced relationship with the pole pieces. A braking coil $L_1$ and a biasing coil $L_2$ are wound around the magnetic yoke 5 to control the magnetic flux $\phi$ acting on the metal disk 3. Namely, an eddy current is generated in the metal disk 3 by the magnetic flux penetrating therethrough to give a braking force corresponding to the current flowing through the field coils $L_1$ and $L_2$ to the metal disk 3. The rotation control of the metal disk 3, and hence the rotation control of the tape reel, is achieved by forming a feed-back circuit between the rotation speed detector D and the field coil $L_1$.

Figure 2:
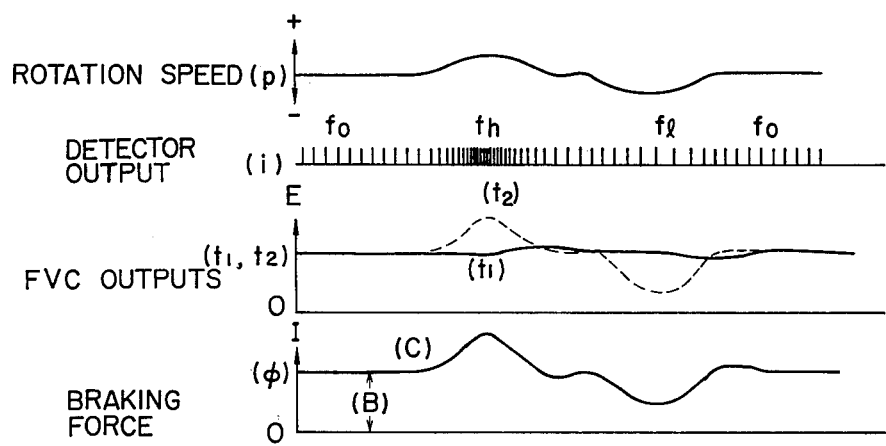
FIG. 2 is a time chart showing the signal waveshapes at various points of the circuit of FIG. 1.

The output of the magnetic detector D forms a pulse signal, the repetition frequency of which corresponds to the rotation speed of the rotating disk 1, as shown by the waveshape $i$ of the time chart of FIG. 2, in which the rotation speed of the tape reel is represented by the waveform $p$. The output frequency of the detector D varies from the standard value $f_o$ to high and low values $f_h$ and $f_l$ corresponding to an increase and decrease in the rotation speed of the rotating disk 1.

The output pulse signal of the detector D is amplified and shaped in ac sense in a pre-amplifier $A_1$ and then supplied to a pair of frequency-voltage converters $FVC_1$ and $FVC_2$ having different time constants. Then, the output dc voltages $t_1$ and $t_2$ (FIG. 2) of the frequency-voltage converters $FVC_1$ and $FVC_2$ are supplied to the positive and negative input terminals (+) and (−) of a differential amplifier DA.

The time constant $\tau_1$ of the frequency-voltage converter $FVC_1$ is set large relative to that $\tau_2$ of the other frequency-voltage converter $FVC_2$. For example, $\tau_1$ is 2 seconds while $T_2$ 0.1 second. Thus, when the frequency of the detector output $i$ varies during a short period, the output $t_1$ of the frequency-voltage converter $FVC_1$ shows almost no or only a small change in the output voltage E as shown in FIG. 2, while the output $t_2$ of the frequency-voltage converter $FVC_2$ instantly follows the change of the input $i$. These time constants may be determined according to the operating conditions, such as the running speed of the tape and the details of the respective rotary parts.

The differential amplifier DA provides an output corresponding to the voltage difference of the two inputs at the input terminals (+) and (−) and supplies it to a driver circuit DR. The driver DR, in turn, supplies a current corresponding to the output of the differential amplifier DA to a braking coil $L_1$ which effects braking of the rotation of the metal disk 3 together with the biasing current through the bias coil $L_2$ supplied from a biasing current source S.

Therefore, the total magnetic flux $\phi$ of the magnet 5 is changed as shown in FIG. 2 (waveshape $\phi$). Namely, the sum of the magnetic flux B by the biasing coil $L_2$ and the magnetic flux C of the braking coil $L_1$ is constant when the rotation of the rotary disk 1 is constant at a standard value but changes in the same direction with the short period change of the rotation speed of the rotary disk 1.

Thus, when the rotation speed of the rotary disk 1 increases in a short period, the braking force acting on the metal disk 3 is increased. On the contrary, as the rotation speed of the rotary disk 1 decreases, the braking force is decreased accordingly. Since the rotary disk 1 and the metal disk 3 are connected to the same rotary shaft of the tape reel, a feed-back control is achieved therebetween. Therefore, short period variations in the rotation speed of the tape reel is suppressed to smoothen the running of the tape and to improve the wow-flutter.

Figure 3:
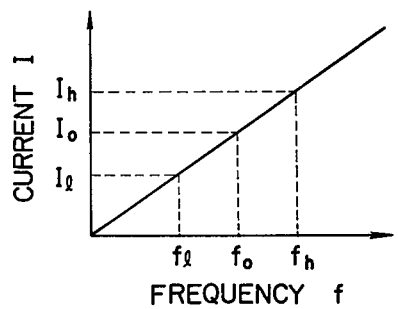
FIG. 3 is a schematic graph of current-to-frequency characteristic for explaining the operation of the circuit shown in FIG. 1.

The frequency-voltage converters $FVC_1$ and $FVC_2$ may be formed of low-pass filters of different time constants. An example of the relationship of the output current I of the driver circuit DR to the input frequency $f$ of the input signal of the frequency-voltage converter is shown in FIG. 3. FIG. 3 shows a linear relationship of the output current to the input frequency, but the linear relationship is not necessarily required as can be seen in the case of the general feed-back control system.

Figure 4:
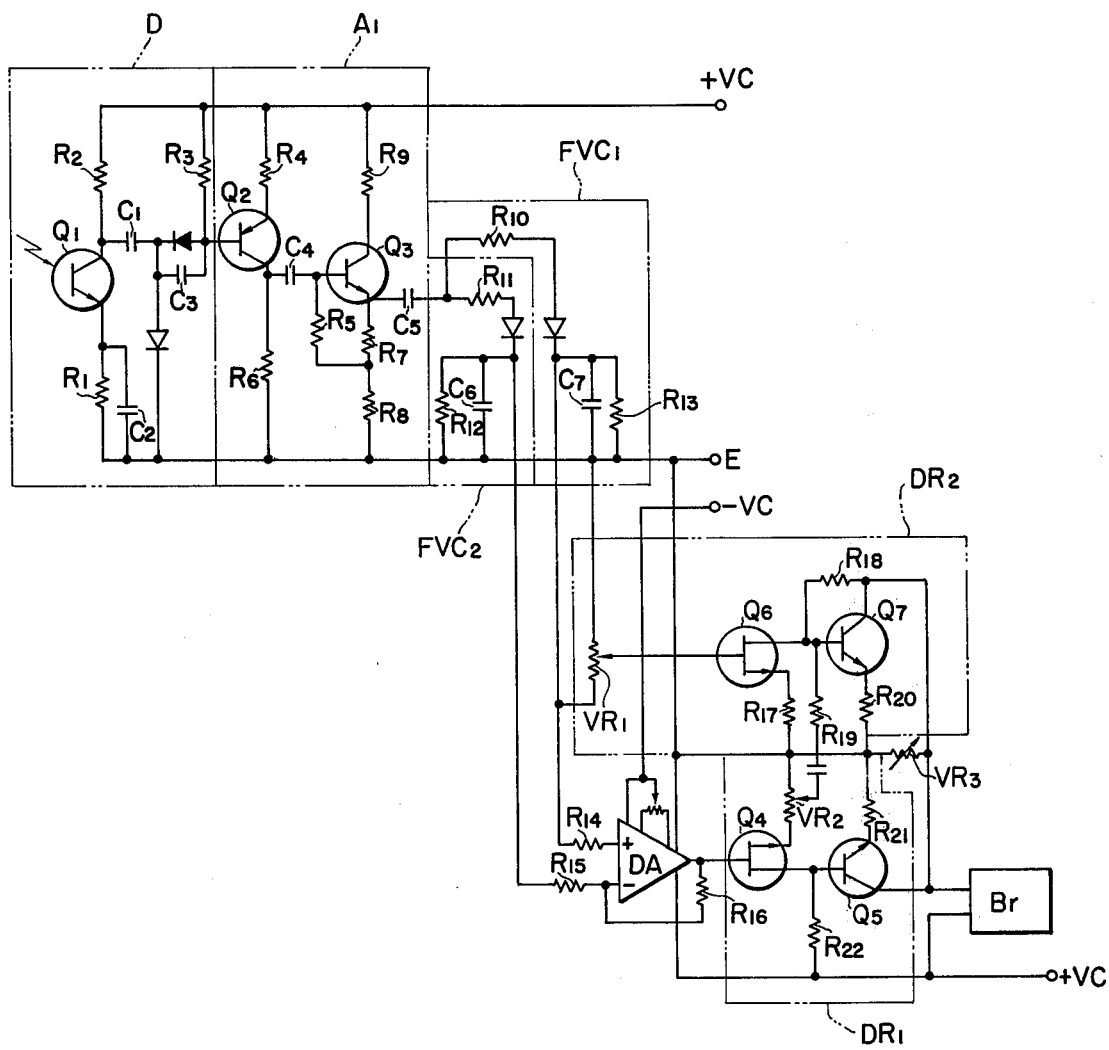
FIG. 4 is a circuit diagram of a rotation control system according to another embodiment of the present invention.

FIG. 4 shows a detailed circuit structure of a rotation control system according to another embodiment of the present invention. Similar symbols as those of FIG. 1 denote similar parts. Letters R, C and Q denote resistor, capacitor and transistor, respectively.

A detector circuit D includes a photo-transistor $Q_1$ which receives a light pulse signal corresponding to the rotation of a tape feeding reel (not shown) and it generates a corresponding conductivity change (on-off) in the collector-emitter path. The output pulse signal of the detector circuit D is amplified in a pre-amplifier circuit $A_1$ including a cascade connection of amplifying transistors $Q_2$ and $Q_3$. The amplified output of the pre-amplifier $A_1$ is supplied to a pair of frequency-voltage converters $FVC_1$ and $FVC_2$ of different time constants. The two outputs of the frequency-voltage converters $FVC_1$ and $FVC_2$ are supplied to the inputs of a differential amplifier DA wherein the difference of these two inputs is differentially amplified and applied to a driver circuit $DR_1$ including a first stage amplifying FET $Q_4$ and a second stage power amplifying transistor $Q_5$. The output of the driver circuit drives braking means Br. Namely, the driving current flows through the path of: supply voltage terminal $V_c$ - braking means Br - collector of transistor $Q_5$ - emitter of transistor $Q_5$ - resistor $R_{21}$ - ground E.

Another driver circuit $DR_2$ is provided for supplying a constant back-tension to the tape, irrespective of the diameter of the tape roll on the feed reel. Namely, the output of the frequency-voltage converter $FVC_1$ is applied through a variable resistor $VR_1$ to the gate of an FET $Q_6$. The output of the FET $Q_6$ is power-amplified in a transistor $Q_7$. The driving current flows through the path of: supply voltage terminal $V_c$ - braking means Br - collector of transistor $Q_7$ - emitter of transistor $Q_7$ - resistor $R_{20}$ - ground E. Provided that the time constant $\tau_1$ of the frequency-voltage converter $FVC_1$ is larger than the time constant $\tau_2$ of the other converter $FVC_2$, when the diameter of the tape roll mounted on the feeding reel becomes small, the repetition frequency of the pulse signal becomes large and the output of the converter $FVC_1$ becomes large. Then, the driving current through the driver circuit $DR_2$ decreases to decrease the braking force. Thus, the back-tension acting on the tape can be maintained constant. Needless to say, the driver circuit $DR_1$ which corresponds to the driver circuit DR in FIG. 1 controls the current through the braking means Br in accordance with the change in a short period of the tape reel speed.

A variable resistor $VR_3$ establishes a current path of: supply voltage terminal $V_c$ - braking means Br - variable resistor $VR_3$ - ground E. Thus, a constant current is allowed to flow through the braking means Br to give a constant biasing brake force.

The detector means for generating a frequency signal corresponding to the rotation speed of a reel and the braking means are not restricted to those shown in FIGS. 1 and 4. Any kind of rotation means and braking means can be adopted. Further, the pre-amplifier circuit may be a pulse amplifier and the differential amplifier DA may be substituted by a comparator circuit. The biasing current source S and bias coil $L_2$ may be spared provided that the differential amplifier DA and the driver DR are so constructed that a predetermined bias current is allowed to flow through the braking coil $L_1$ irrespective of the differential output of the amplifier DA. It will be apparent that the respective circuit components and the circuit structure may be altered or modified in various ways as desired to the design conditions.

We claim:

1. A rotation control system for a rotating member, comprising: detection means for generating a pulse signal having a frequency corresponding to the rotation speed of said rotating member;
   a plurality of frequency-voltage converters responsive to said pulse signal, for generating a signal representing the rate of change of said rotation speed; and
   braking means, responsive to said signal representing the rate of change of said rotation speed, for controllably effecting braking of said rotating member.

2. A rotation control system according to claim 1, wherein said plurality of frequency-voltage converters have different time constants.

3. A rotation control system according to claim 2, wherein said plurality of frequency-voltage converters are low-pass filters.

4. A rotation control system according to claim 2, wherein said braking means is an eddy current brake connected to said rotating member.

5. A rotation control system according to claim 2, wherein said detector means comprises a magnetic flux generating means coupled to said rotating member for generating changes of magnetic flux at a predetermined position and a magnetic flux detection means disposed at said predetermined position for generating said pulse signal having the frequency representing the rotation speed of said rotating member.

6. A rotation control system according to claim 2, wherein said detector means comprises a light pulse generating means for generating light pulses of a frequency corresponding to the rotation speed of said rotating member and a photoelectric converter for receiving said light pulses and for generating an electric signal corresponding to the light pulses.

7. A rotation control system according to claim 2, further comprising a biasing braking means for generating a braking force corresponding to the output of one of said plurality of frequency-voltage converters.

8. A rotation control system according to claim 7, wherein said one of said plurality of frequency-voltage converters has the largest time constant among said plurality of frequency-voltage converters.

9. A rotation control system according to claim 8, further comprising means for applying a constant braking force to the rotation of said rotating member.

* * * * *